(12) United States Patent
Stewart et al.

(10) Patent No.: US 7,397,152 B2
(45) Date of Patent: Jul. 8, 2008

(54) CIRCUITRY FOR INCREASING EFFICIENCY OF A LINEAR ELECTRIC GENERATOR

(75) Inventors: David B. Stewart, Cranbury, NJ (US); Henry I. Schanzer, Edison, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 175 days.

(21) Appl. No.: 11/030,933

(22) Filed: Jan. 7, 2005

(65) Prior Publication Data

US 2005/0206247 A1 Sep. 22, 2005

Related U.S. Application Data

(60) Provisional application No. 60/553,666, filed on Mar. 16, 2004.

(51) Int. Cl.
*H02K 41/00* (2006.01)
(52) U.S. Cl. .......................................... 310/12; 310/14
(58) Field of Classification Search ............. 310/11–14; 322/46
See application file for complete search history.

(56) References Cited

U.S. PATENT DOCUMENTS

| 4,649,283 | A * | 3/1987 | Berchowitz et al. | 290/1 R |
| 5,347,186 | A * | 9/1994 | Konotchick | 310/17 |
| 6,359,365 | B1 * | 3/2002 | Kalsi | 310/261 |
| 7,109,687 | B2 * | 9/2006 | Kashihara | 322/24 |

* cited by examiner

*Primary Examiner*—Dang D Le
(74) *Attorney, Agent, or Firm*—Henry I. Schanzer, Esq

(57) ABSTRACT

A linear electric generator (LEG) includes sections of coils of an induction coil assembly (ICA) disposed along a distance d1 and apparatus for passing a permanent magnetic assembly (PMA) of length d2, where d2 is less than d1, along the coils for generating voltages and power in the coils in close proximity to the PMA. Unidirectional conducting elements are connected between the coils and output power lines to couple the voltages developed across excited coils to the output power lines without the unexcited coils loading down or dissipating the voltage developed across the output power lines.

21 Claims, 12 Drawing Sheets

FIGURE 1 - Prior Art

CIRCUITRY FOR INCREASING EFFICIENCY OF A LINEAR ELECTRIC GENERATOR

CROSS REFERENCES TO RELATED APPLICATIONS

This application claims priority from provisional patent application Ser. No. 60/553,666 titled Wave Energy Converters (WECs) with Linear Electric Generators (LEGs) filed Mar. 16, 2004, the teachings of which are incorporated herein by reference.

BACKGROUND OF THE INVENTION

This invention relates to linear electric generators (LEGs) and to circuitry for improving their efficiency. A problem with known LEGs may be best explained with reference to prior art FIGS. 1 and 2. A LEG may be constructed, as shown in FIGS. 1 and 2, so as to have a long stator (e.g., an induction coil assembly 24 of length d1) and a relatively short permanent magnet assembly 22, of length d2. When the permanent magnet assembly 22 moves relative to the induction coil assembly 24 a voltage (and a current if a load is connected across the coil assembly) is induced in the coil assembly. An advantage of systems in which the coil is made much longer than the magnet, as compared to those with long permanent magnet assemblies and short induction coil (stator) assemblies, includes the ability to hold the wiring of the induction coil assembly stationary (i.e., cables are not continually moved or flexed). Another advantage of such systems is that the long coils and short permanent magnet enable the use of relatively simple passive permanent magnet dampers/brakers (e.g., passive dampers can be formed by placing conductive plates at the ends of the travel of the permanent magnets to form a passive damper or brake). Still another advantage of having a relatively short permanent magnet is that big and long magnets present a hazard in that they tend to attract a large amount of debris.

Although the structure shown in FIGS. 1 and 2 has many advantages, a problem with known linear electric generators having a long induction coil assembly and a relatively short permanent magnet assembly is that the electric current generated in the coils has to pass (flow) through the entire coil assembly (i.e., all the coils) in the stator, as illustrated in FIG. 1. The useful voltage derived from the coils is obtained from those coils and coil sections directly opposite and very close to the permanent magnet assembly. This useful voltage induces a current which flows through the coils. The portions of the stator coils that are not adjacent (or directly opposite) to the permanent magnet assembly (PMA) and those that do not interact with the magnet assembly cause a voltage drop in the coil (i.e., due to the resistance and inductance of the coil) without enhancing the generation of additional current. The voltage drop due to the resistance/impedance of the coils not contributing to the generation of voltage (current) results in significant losses in the power being generated by the LEG.

A proposed solution to the problem is shown and discussed in a co-pending application titled Coil Switching Circuit for Linear Electric Generator by David B. Stewart et al filed concurrently herewith and bearing Ser. No. 11/030,932 and assigned to the same assignee as the instant application and whose teachings are incorporated herein by reference. The Coil Switching application teaches the use of a switching arrangement for coupling only selected sections of coils of the induction coil assembly (ICA) of a LEG across output lines of the LEG. The selected sections include those sections of coils of the ICA closest to the passing PMA. A disadvantage of the proposed solution is that it requires the use of switches to couple the active coils to the output lines of the LEG and switches to decouple or bypass the inactive coils. For proper operation of the system using a switching arrangement, position sensors, and/or other appropriate means, are needed to sense the position of the PMA relative to the ICA to constantly turn switches on and off in order to ensure that only desired coils are in fact connected in circuit. This disadvantage is overcome in circuits and systems embodying the invention.

SUMMARY OF THE INVENTION

A linear electric generator (LEG) system embodying the invention includes: (a) an induction coil assembly (ICA), which may be either of the type known as a "tapped" configuration or as a "segmented" configuration, having N sections of induction coils disposed linearly along a length d1 with the coils exhibiting inductance and resistance along their length; (b) apparatus for passing a permanent magnetic assembly (PMA) of length d2, where d2 is smaller than d1, along and over the ICA for generating voltages across the coils in close proximity to the PMA; and (c) unidirectional conducting means coupled between the sections of induction coils and first and second output points of the LEG for automatically coupling those coil sections rendered active by the passing PMA to the first and second output points while isolating or decoupling the non-active coil sections from being coupled to the first and second output points.

In one embodiment of the invention, each coil has first and second terminals with each coil terminal being coupled via a first diode to a first output line and via a second diode to a second output line. A central energy storage element is coupled to the first and second output lines for gathering the energy produced by the coils due to the passing PMA.

In another embodiment of the invention, there is a first and second output line for each coil section and an independent energy storage element is provided for each coil section to store the energy produced by its associated coil. The energy storage elements of all the coil sections are selectively coupled via sampling circuits to a central energy storage element. LEGs embodying the invention are highly suited for use with WECs.

BRIEF DESCRIPTION OF THE DRAWINGS

In the accompanying drawing like reference characters denote like components.

DETAILED DESCRIPTION OF THE INVENTION

Features and various structures of linear electric generators (LEGs) embodying the invention are shown in FIGS. 3-10. In these figures, for ease of description, only one of three possible electrical phases is shown. However, it should be understood that the apparatus may, and typically will, include one or more (e.g. 3) phases. One application of linear electric generators (LEGs) embodying the invention is as a power take off (PTO) device in wave energy converters (WECs) which are placed in a body of water and which include elements (e.g., shaft, 3 and shell, 5) responsive to the motion of the waves in the body of water to produce electric energy. However, it should be understood that a LEG embodying the invention may be used in any other suitable application.

Figure 4A:
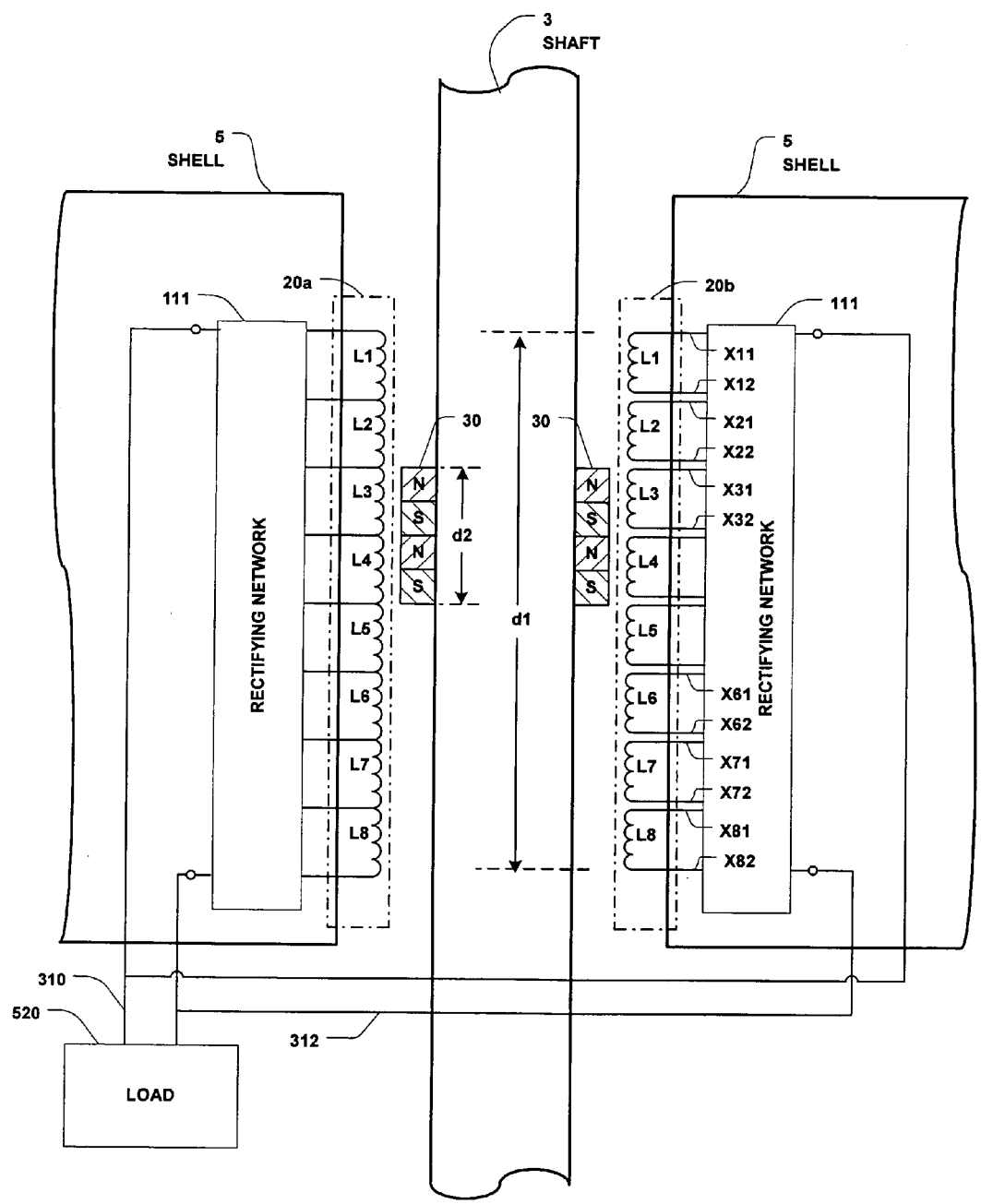
FIGS. 4A and 4B illustrate the mounting of LEGs embodying the invention in a WEC.
Figure 4B:
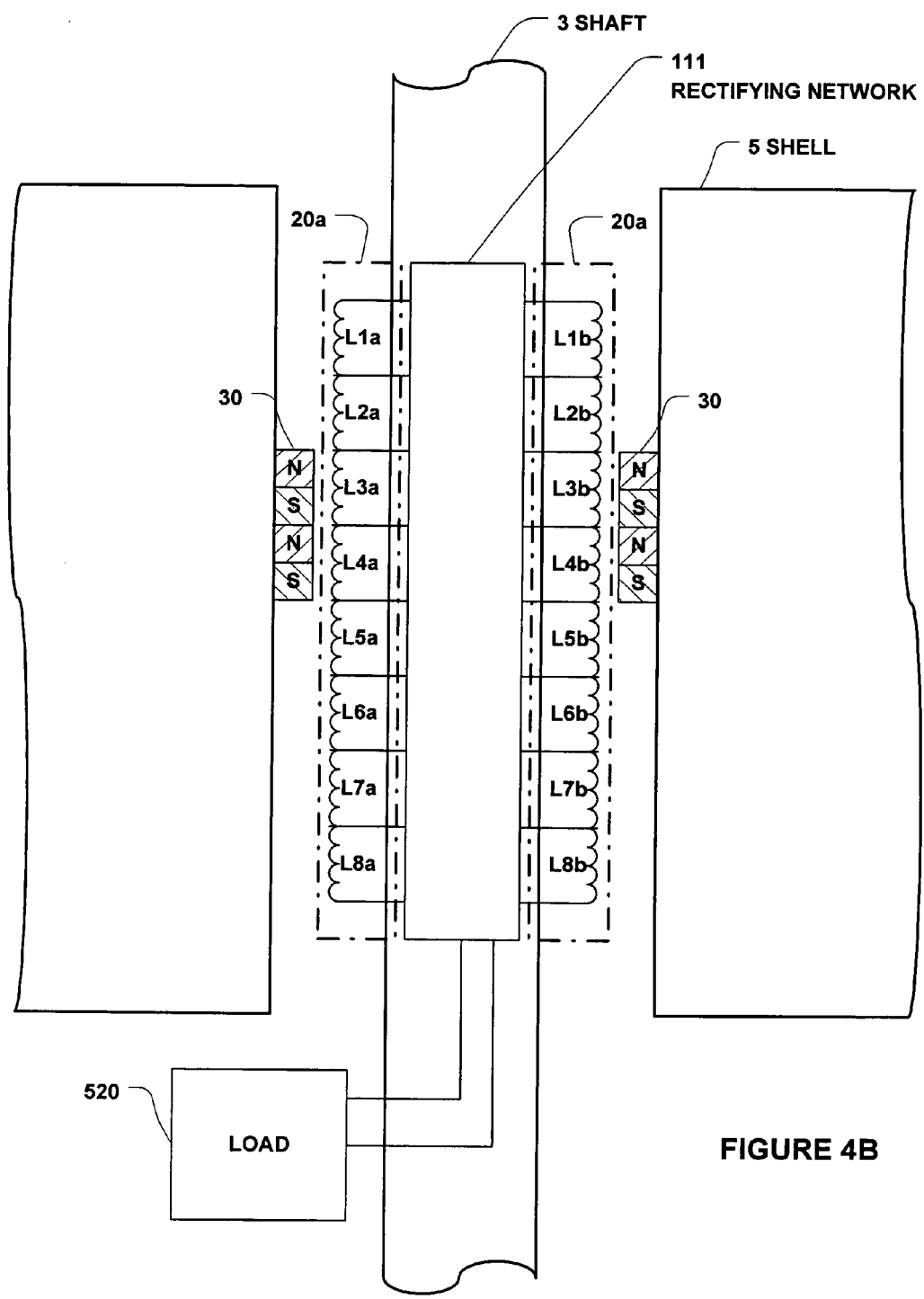

As shown in the figures, LEGs embodying the invention include a permanent magnetic assembly (PMA) 30 and an induction coil assembly (ICA) 20 separated by a small air gap. In this application it is assumed that the length (d2) of the PMA 30 is smaller than the length (d1) of the ICA 20. In a WEC embodying the invention, the PMA 30 may be attached to (or mounted on) one of a shaft 3 and shell 5, and the ICA 20 may be attached to (or mounted on) and disposed along the other one of the shaft 3 and shell 5 as shown in FIGS. 4A and 4D. In systems embodying the invention, the shaft or the shell may move relative to the other, or both may move relative to each other.

The PMA 30 is typically constructed of multiple pairs of "north" and "south" polarized magnets mounted on the surface of a ferromagnetic material structure (e.g. steel) with the poles oriented perpendicular to the line of the air gap. These magnets comprise a magnetic "pole pair". The magnetic circuit may be comprised of a pair of magnets, "air" gaps, a stator yoke, and a magnet backing plate, the latter two items being constructed of ferromagnetic material.

The PMA 30 may also be constructed of multiple pairs of north and south polarized magnets "buried" in a ferromagnetic yoke. In this case, the north and south poles are oriented parallel to the air gap. In such a case, the magnetic circuit may be comprised of magnets, two air gap crossings, and ferromagnetic magnet and stator yokes. However, note that any other suitable PMA structure may be used to practice the invention.

Figure 3A:
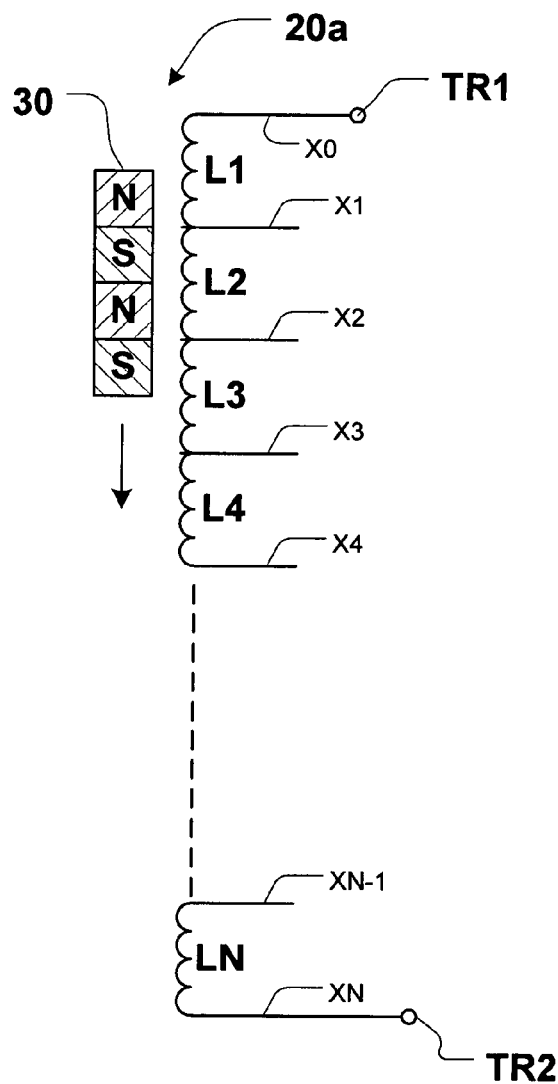
FIG. 3A is a schematic representation of a "tapped" induction coil assembly for use in practicing the invention.
Figure 3B:
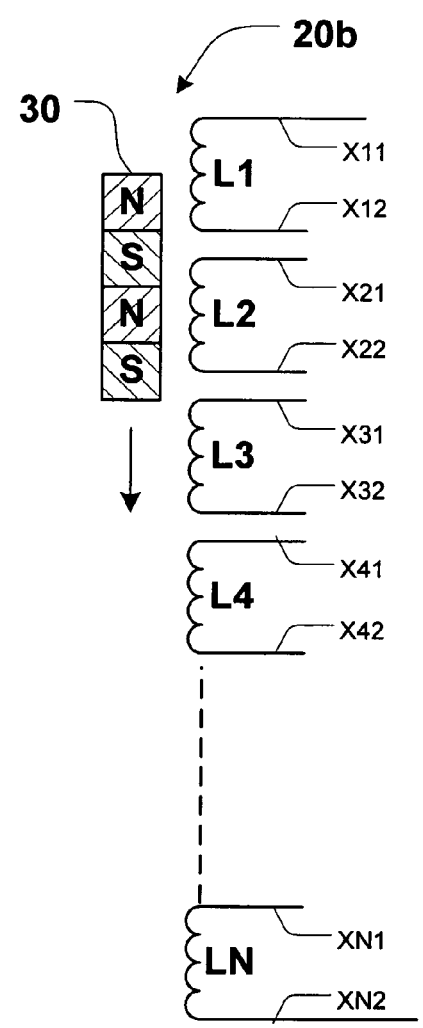
FIG. 3B is a schematic representation of a "segmented" induction coil assembly for use in practicing the invention.

An induction coil assembly (ICA) 20 used to practice the invention may include either a "tapped" coil configuration 20*a* as shown in FIG. 3A, or a "segmented" coil configuration 20*b*, as shown in FIG. 3B. FIGS. 3A and 3B are simplified schematic representations illustrating the use of a "tapped" coil configuration 20*a* (FIG. 3A) and a "segmented" coil configuration 20*b* (FIG. 3B). In the tapped configuration which includes a string of coils (L1-LN), which are connected in series between two output terminals (TR1, TR2), each coil (Li) has first and second ends and, except for the first and last coil, one end of each coil is fixedly connected to one end of the previous coil and the other end of each coil is fixedly connected to one end of the next, succeeding, coil. In the segmented configuration, each coil (Li) has two terminals (Xi1, Xi2) which may be freely connected. In systems embodying the invention, the ICA (generically identified as ICA 20) may be linearly disposed along the length of a supporting member (e.g., a shell or shaft).

Flux from a pair of "north" and "south" polarized magnets is coupled to the coil segment via an air gap. The length of each coil segment may be equal to the length of one of these magnet pole pairs. A PMA may consist of several pole pairs and extend over less than one, one, or more than one, coil segment.

Figure 10:
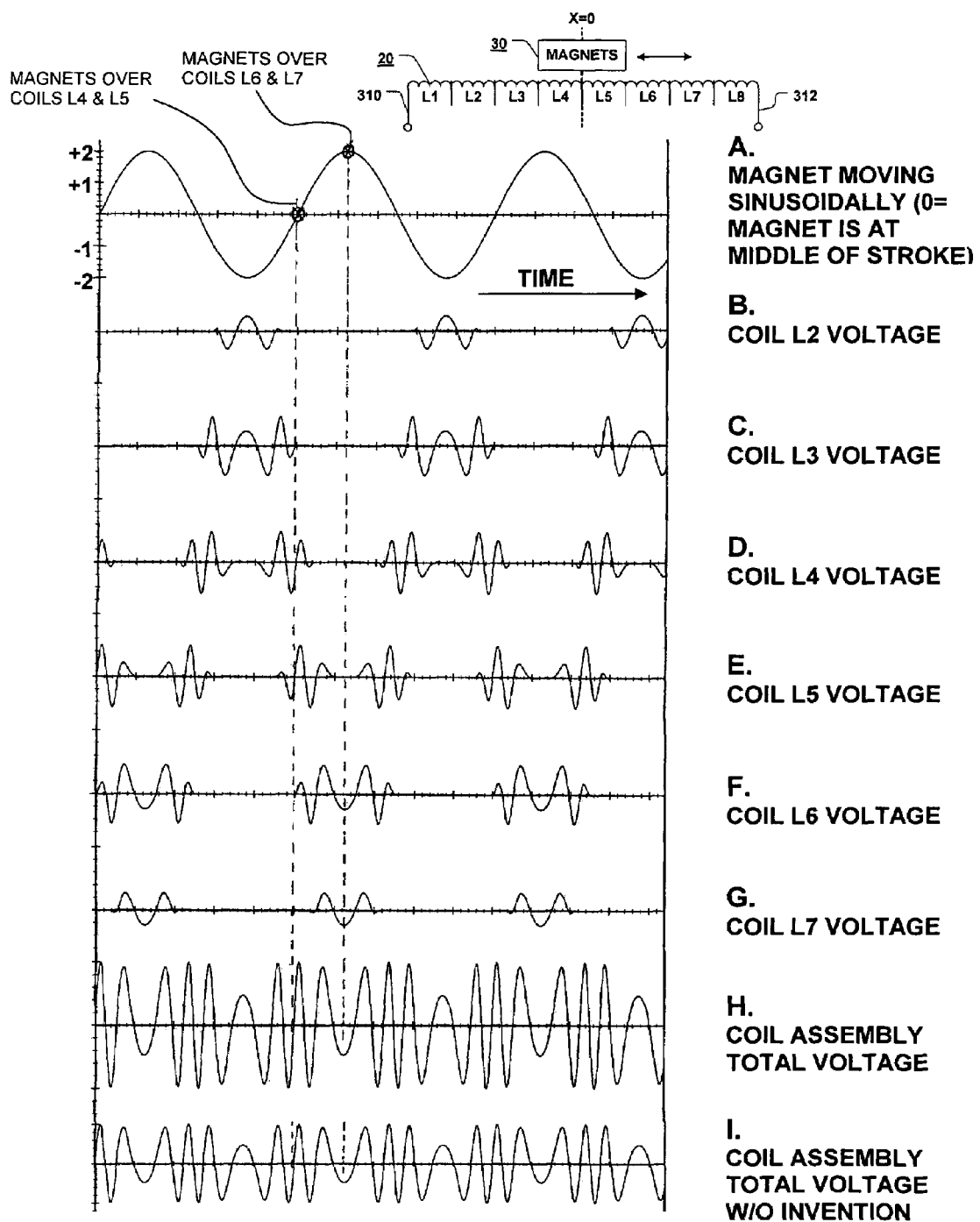
FIG. 10 is a waveform diagram illustrating the operation of a LEG embodying the invention.

In LEG systems embodying the invention a permanent magnetic assembly (PMA) 20 passes over and along the ICA separated from it by a gap to generate a voltage in the ICA. The basic operation of the voltage generating system may be described as follows. Assume that the PMA 30 is impelled to move relative to, and along, the ICA 20 in response to naturally occurring forces (e.g., ocean waves). As the PMA 30 moves along the coils, from which it is separated by a small air gap, a change in flux is produced. The changing flux caused by the moving magnets induces a voltage in the coils that are near (in close proximity to) the magnets ($e = Nd\phi/dt$); these coils are also referred to herein and in the accompanying claims as "active" coils or "excited" coils. The amplitude and frequency of the voltage induced in each individual active coil is a function of the speed of the magnet(s) relative to the coils and of the magnet-coil coupling properties. When an external load is connected across the terminals of an "active" coil, or coils, current flows through the coils and the load connected across the coil(s). Note that there is very little, or any, useful voltage developed across the coils which are not in close proximity to the PMA 30, as illustrated in FIG. 10.

Note also that the voltage generated across an "active" segment of the coil(s) as a result of the changing magnetic flux as the PMA passes over the coil(s) will typically be an alternating type (A.C.) voltage. The nature of the varying voltage produced presents significant problems to the efficient capture and harnessing of the developed voltage. As already noted, these problems are overcome in circuits and systems embodying the invention.

FIG. 4A is semi-schematic semi-block simplified diagram showing a permanent magnetic assembly (PMA) 30 attached to the shaft 3 of a WEC and eight coil sections (L1-L8) of a tapped coil assembly, ICA 20*a*, are laid out linearly along the length of one side of a shell 5 and eight coil sections (L1-L8) of a segmented induction coil assembly (ICA) 20*b* laid out linearly along the length of another side of shell 5. This is done to illustrate that the invention may be practiced using a tapped or a segmented configuration, In FIG. 4A each coil (Li) is made such that its two ends (Xi1, Xi2) are initially disconnected from any other element and are free to be connected to any point selected by the designer. As the PMA 30 passes by certain coil sections (e.g., L3 and L4) a voltage is induced in those coil sections. The coils in which a voltage is induced are referred to as being "activated" or "excited". Very little voltage, if any, is induced in the coil sections which are not in close proximity to PMA 30. The more a coil is distant from PMA 30, the more negligible is the voltage induced in that coil.

FIG. 4A also shows eight coil sections (L1-L8) of a tapped induction coil assembly (ICA) 20*a* laid out linearly along the length of a shell 5. In this ICA 20*a* configuration the coils are connected end to end. This showing is intended to demonstrate that the invention may be practiced using either a tapped configuration or a segmented configuration.

In contrast to the prior art schemes, in systems and circuits embodying the invention, the voltages produced at the outputs of the coil sections (ICA 20*a*, 20*b*) are coupled via a rectifying network 111 to output lines 310, 312 across which is connected a power converter 520. The rectifying network 111 may be comprised of unidirectional conducting elements (e.g., rectifiers or diodes) which provide conduction paths to the output lines (e.g., 310, 312) to which may be connected one or more loads.

In the circuit of FIG. 4A, each coil Li of the segmented configuration has two output nodes (ends or terminals) Xi1 and Xi2. To better understand and appreciate the discussion to follow, it should be noted that, if the coils are not properly or correctly interconnected, when many coils are connected in parallel between the output lines with some of the coils being "excited" due to their proximity to the passing PMA 30 and some (actually most) coils being "unexcited" because of their distance from the PMA 30, the unexcited or inactivated coils (those physically distant from the PMA 30) function either as low impedance paths which shunt and dissipate the energy produced by the activated and excited coils or act as series impedances which cause much of the generated energy to be dissipated.

Figure 5A:
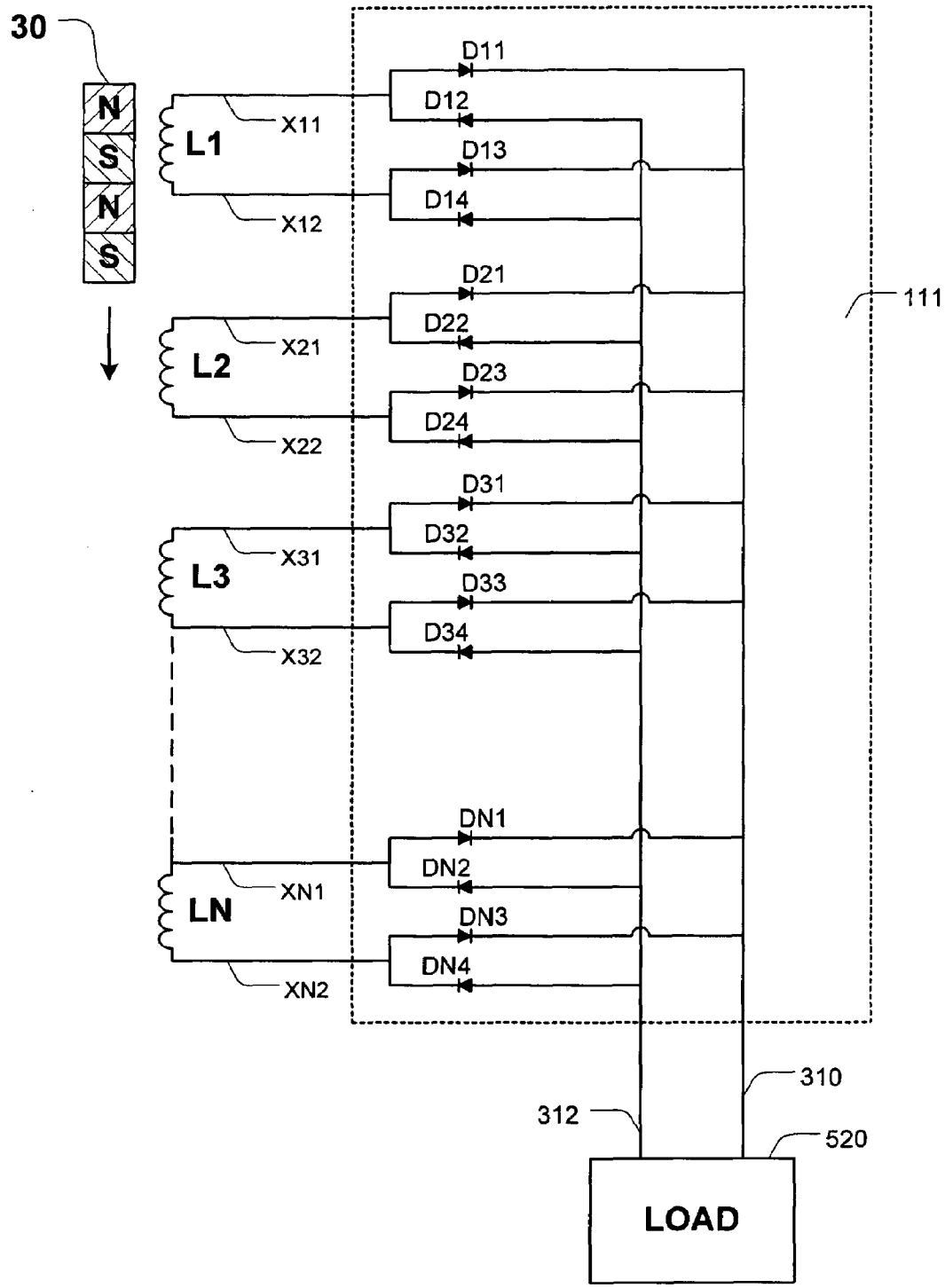
FIGS. 5A and 5B are schematic diagrams of one embodiment of the invention using a segmented ICA.

In FIG. 4A, the two ends of each coil section of ICA 20b are free to be connected to any selected circuit. FIG. 5A shows the components of a rectifying circuit 111 for interconnecting the coils of the ICA 20b of FIG. 4A to output lines 310 and 312 so the sinusoidal voltages produced across each coil, as the PMA 30 moves across the coil, are fully captured; and such that the unexcited coils do not load down the excited coils. Note that the ICA 20b and the rectifying network of FIG. 5A may be redrawn as shown, schematically, in FIG. 5B to illustrate that each coil (Li) is effectively connected across the mid-point of a four (4) diode bridge for providing full wave rectification for the AC voltages induced in the coil due the passing of the PMA 30 over the coil.

As to each coil (Li) there is: (a) a diode Di1 connected at its anode to terminal Xi1 and at its cathode to line 310; (b) a diode Di2 is connected at its anode to line 312 and at its cathode to node Xi1; (c) a diode Di3 connected at its anode to node Xi2 and at its cathode to line 310; and (d) a diode Di4 connected at its anode to line 312 and at its cathode to terminal Xi2. For the configuration of FIGS. 5A and 5B there are 4 diodes per coil which are poled to ensure that, regardless of the direction of the voltage induced across the coil, conventional current will flow such that the voltage on line 310 will be positive relative to the voltage on line 312.

Figure 5B:
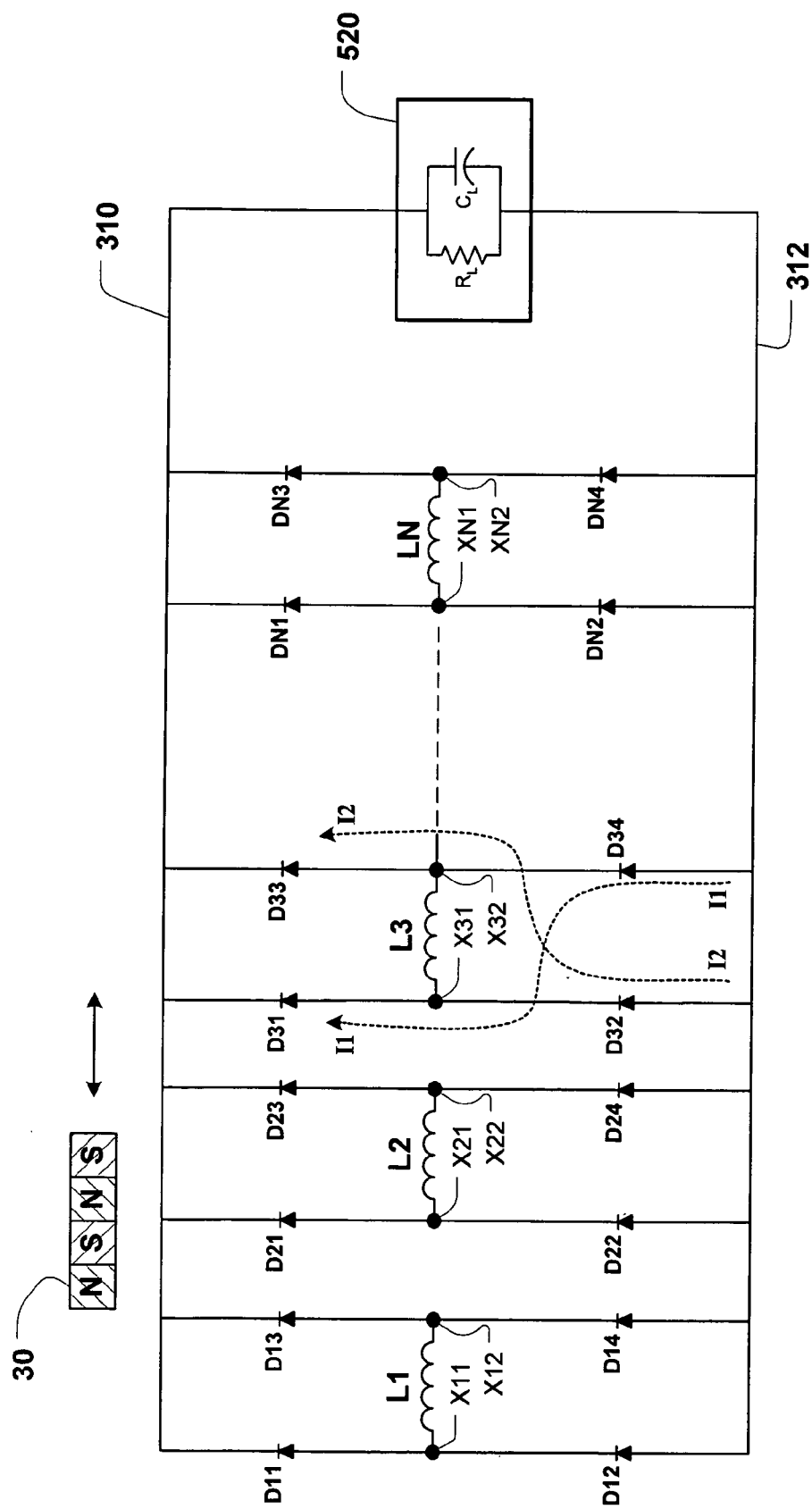

Referring to FIG. 5A or 5B, when, for example, the PMA 30, passing across coil L1, causes the voltage at node X11 to be greater than the voltage at node X12, a current I1 flows from line 312 via diode D14, coil L1, and diode D11 into line 310 and then into RL and through RL back to line 312. This voltage/current causes the voltage on line 310 to be more positive than the voltage on line 312. Note that the diode networks interconnecting the other coils between lines 310 and 312 are back-biased and prevent the flow of currents (except for leakage currents which are negligible) through the unexcited coils. Thus, there is no low impedance path shunting the active coils producing the desired voltages due to the interaction between the coils and the PMA 30.

Similarly, when PMA 30 induces a voltage across the coil such that the voltage at X12 is greater than the voltage at X11, a current I2 flows from line 312 via diode D12 through the coil L1 and then through diode D13 into line 310 and then to the load RL.

Thus, regardless of the direction of motion of PMA 30 relative to the ICA 20 and regardless of the position of the PMA relative to the ICA 20, the voltages induced across the coils are collected and fed into the power converter, illustrated in FIG. 5A as load 520 and in FIG. 5B as RL, for ease of description. As the PMA 20 moves down (or up) along the coils, each coil, in turn, will be activated and supply voltage and current into the load. The collected voltage and current from each coil may then be processed to supply energy to an ultimate load such as another system or any machine including a motor.

Figure 6:
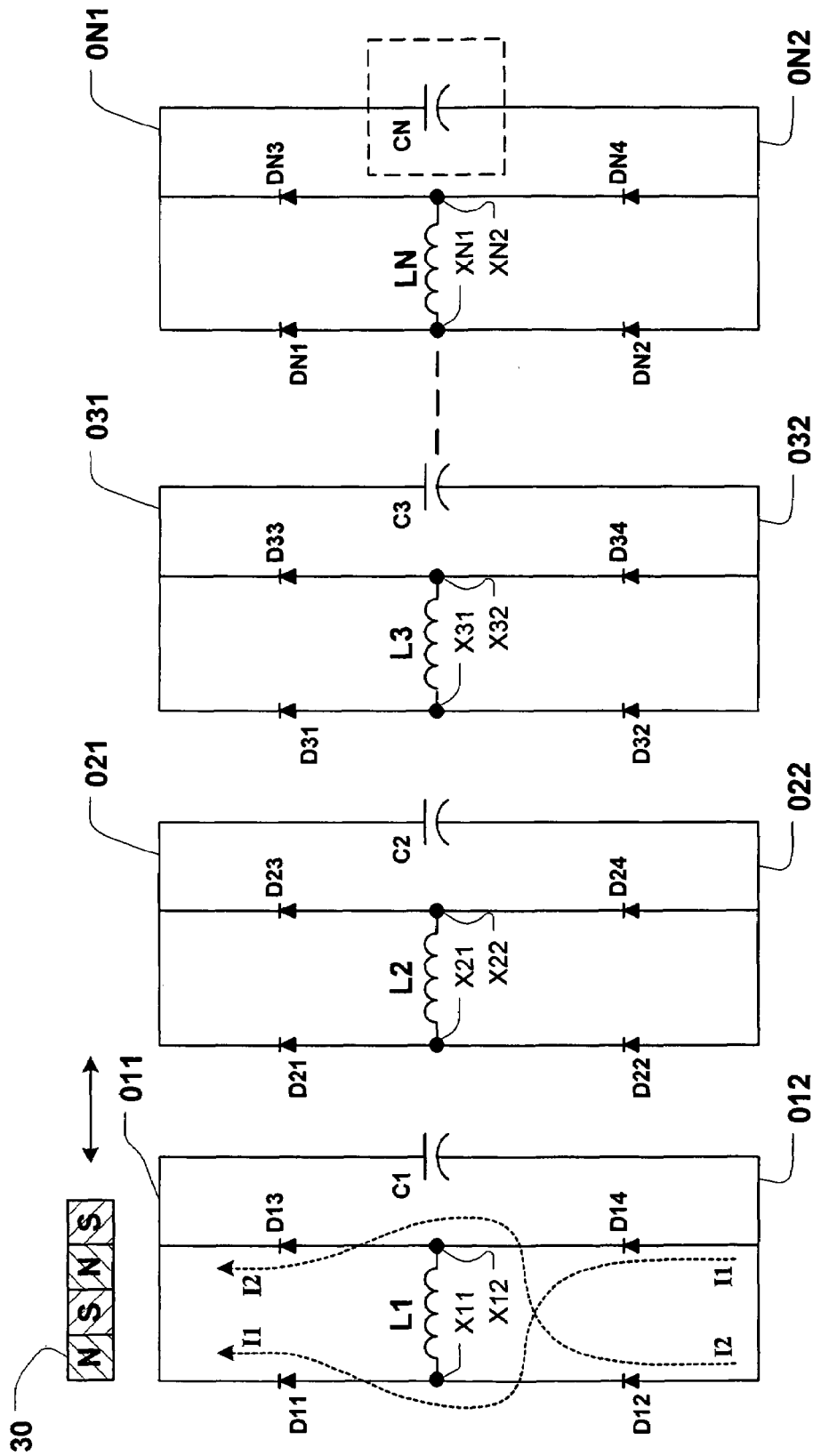
FIG. 6 is a schematic diagram of another embodiment of the invention using a segmented ICA.

FIG. 6 illustrates another inventive embodiment for obtaining the power generated in each coil section of a segmented ICA 20. In FIG. 6 each coil section (Li) is connected via its own full wave rectifying network (Di1, Di2, Di3, Di4) to its own local load (Ci), which in this figure is shown to be a capacitive storage element. Each coil section (Li) has its own outputs (Oi1, Oi2). Thus, in FIG. 6, each coil section may be treated as being physically and electrically separated and independent of any other coil section. Each coil section can then function has an independent power generator, whose power generating capability is unaffected by the action and output of any other coil section.

The configuration of FIG. 6 in which each coil has its own output is intended to avoid a problem which may occur with the circuit of FIGS. 5A and 5B. In FIGS. 5A and 5B if one active coil section produces a larger voltage than a neighboring coil section, it will cause the coupling diodes of the neighboring coil section to be back biased and prevents the neighboring coil section from applying and/or supplying its induced voltage across the load. Accordingly, in FIG. 6 each coil section is coupled to its own load or storage element (e.g., Ci) which can store the energy produced by its corresponding coil section. Due to the connection of a rectifying circuit to each coil (Li), the output voltages (VOi) produced across each local storage element (Ci) will be direct current (d.c.) type voltages.

Figure 7:
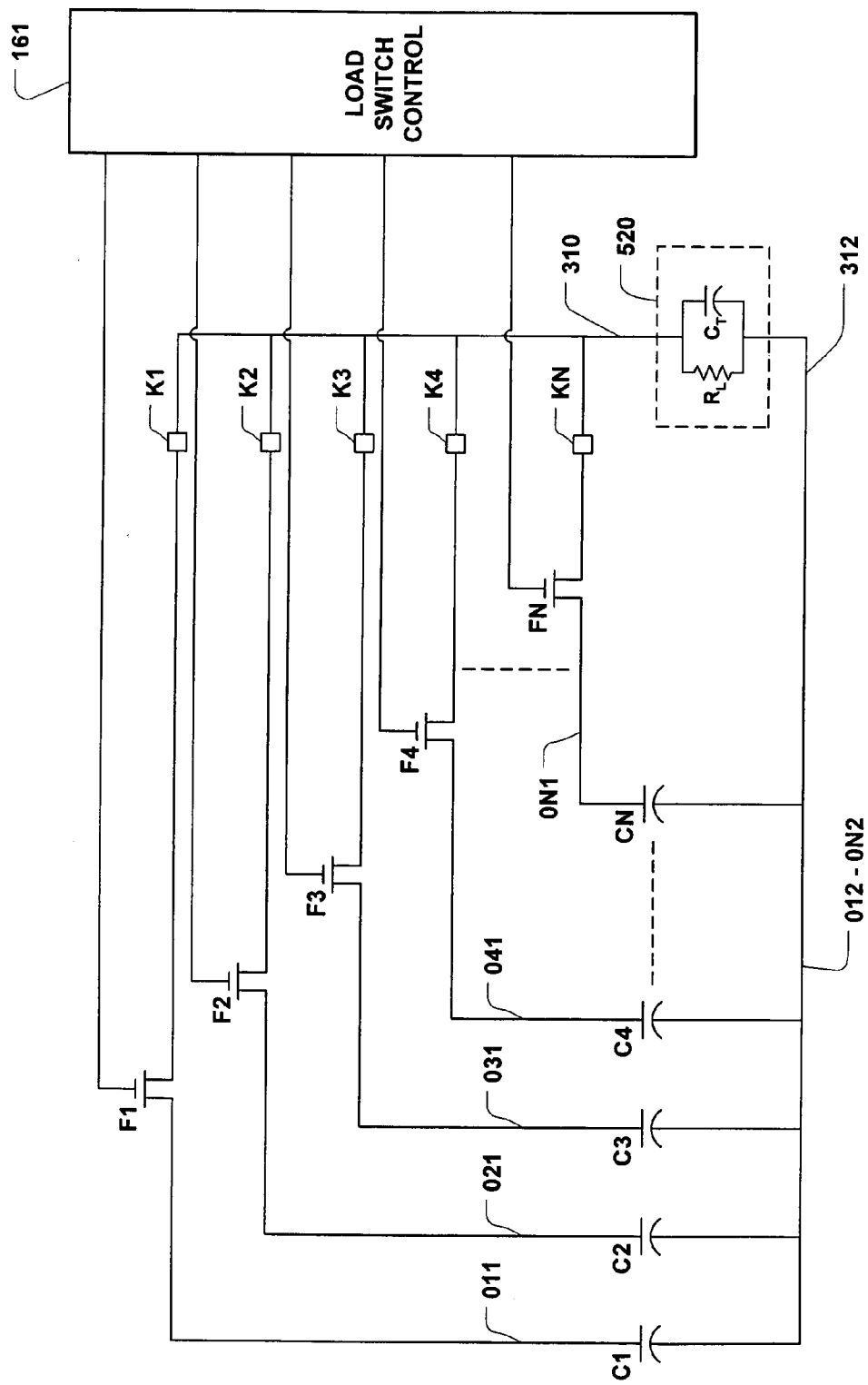
FIG. 7 is a schematic diagram of a power summing system embodying the invention for use with the embodiment of FIG. 6.

FIG. 7 illustrates that the output voltages (VOi1, VOi2) of the separate storage elements of the coils of FIG. 6 can be sampled and supplied to a central storage and load element 520 which may include resistance (RL) and capacitance CT. In FIG. 7, by way of example, the more negative output terminals (Oi2) of the separate coil sections (see also FIG. 6) are connected in common to an output power line 312. Each more positive output terminal (Oi1) of each coil section is connected to one side of a switch (Fi) which may be an insulated gate field effect transistor (IGFET) (or any suitable switch which may include any of the type of switches discussed in co-pending application). The other side of each switch Fi is shown connected via a network Ki to an output power line 310. The switches Fi may be sampled (turned on and off) by a load switch control circuit 161 to effectuate a transfer of the power developed across the individual storage elements Ci to a central storage element CT in power device 520. That is, the main (source to drain) conduction path of each transistor switch Fi is connected between a coil output (Oi) and a network (Ki) and the gate of each Fi is coupled to switch control network 161 which selectively turns the switches Fi on and off to effectuate the transfer of power from each coil section to the central load.

Figure 8:
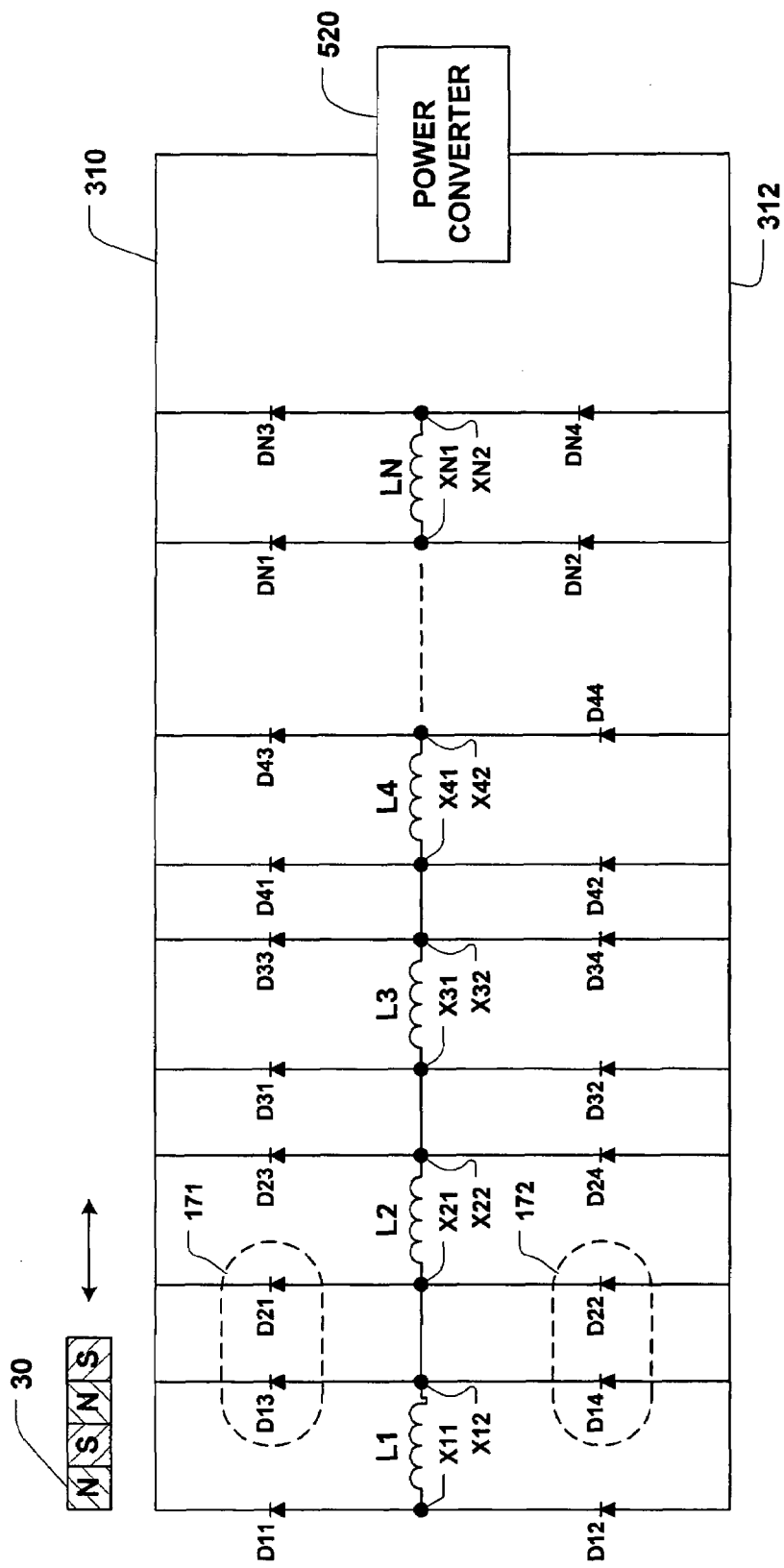
FIG. 8 is a schematic diagram of one embodiment of the invention using a tapped ICA configuration.

This circuit arrangement tends to ensure that all the power generated between each coil and the PMA is captured. This assumes that power losses within the two diodes which function to couple the coil or coils across the output lines and other switching losses are minimal. Thus each coil capacitor can be selectively sampled and its contents transferred to a central storage element In the alternative, the capacitive storage elements can be directly connected in parallel to form a common load as shown in FIG. 8 (and FIGS. 5A and 5B). In FIG. 8, the coil sections (L1-L8) of an ICA 20 are shown connected end to end with adjacent coils having their end terminals connected in common. This configuration may be achieved by connecting the coils of a segmented configuration end to end or starting off with a tapped configuration. In any event, so connected, the coil configuration is equivalent to, and may be termed, a "tapped" coil configuration, as discussed above. That is, the second terminal X12 of L1 is connected to the first terminal X21 of L2 and the second terminal X22 of L2 is connected to the first terminal X31 of L3, and so forth. Each coil section Li is shown connected via a fully rectifying network of 4 diodes between output power terminals 310 and 312. For this configuration, adjacent coil sections share two diodes (e.g., 171 and 172). For this configuration, the number of diodes may be reduced and the total number of diodes could be equal to two plus two times the number of coil sections. This compares to 4 diodes per coil for the coil configuration of FIGS. 5A, 5B and 6.

This circuit configuration, when compared to that of FIGS. 5A and 5B, has the advantage that all "excited," or "active," coil sections contribute voltage and power to the output lines 310 and 312, regardless of their individual coil voltage, provided the voltages of the individual coils are "in phase" or nearly in phase (i.e. the voltage of each excited circuit rises at the same time and falls at the same time).

Referring to FIG. 8, when, for example, the PMA 30, passing across coils L1 and L2, causes these coils to be "active" with the voltage at node X11 to be greater than the voltage at node X12, and the voltage at X12/X21 to be greater than the voltage at X22, a current I1 flows from line 312 via diode D24, coil L2, coil L1 and diode D11 into line 310 and then into the power converter 520 (or RL as in FIG. 5A) and through the power converter back into line 312. This voltage/current causes the voltage on line 310 to be more positive than the voltage on line 312. Note that the other diodes connected to coils L1 and L2 (diodes D12, D13, D21, D14, D22, D23 and D31) are all back-biased due to the polarity of voltage on these active coils, and therefore, prevent the flow of any appreciable current through these back-biased diodes. Note also that the diode networks interconnecting the other coils between lines 310 and 312 are back-biased and prevent the flow of current (except for leakage currents which are negligible) through the unexcited coils. Thus, there is no low impedance path shunting the active coils and the PMA 30.

Similarly, when PMA 30 induces a voltage across the two coils (e.g., L1 and L2) such that the voltage at X12/X21 is greater than the voltage at X11 and the voltage at X22 is greater than the voltage at X21, a current I2 flows from line 312 via diode D12 through coil L1, coil L2 and diode D23 into line 310 and then to the load power converter 520. As above, the diode networks interconnecting the other coils are back biased and there is no shunt path. Thus, so long as the coils and the PMA are constructed such that the voltages induced in the active coils are "in-phase" with each other, the induced voltage will add to each other series-like and contribute to the power generation. It should be appreciated that this has been explained for two coils but this may apply to more than two coils.

Figure 9:
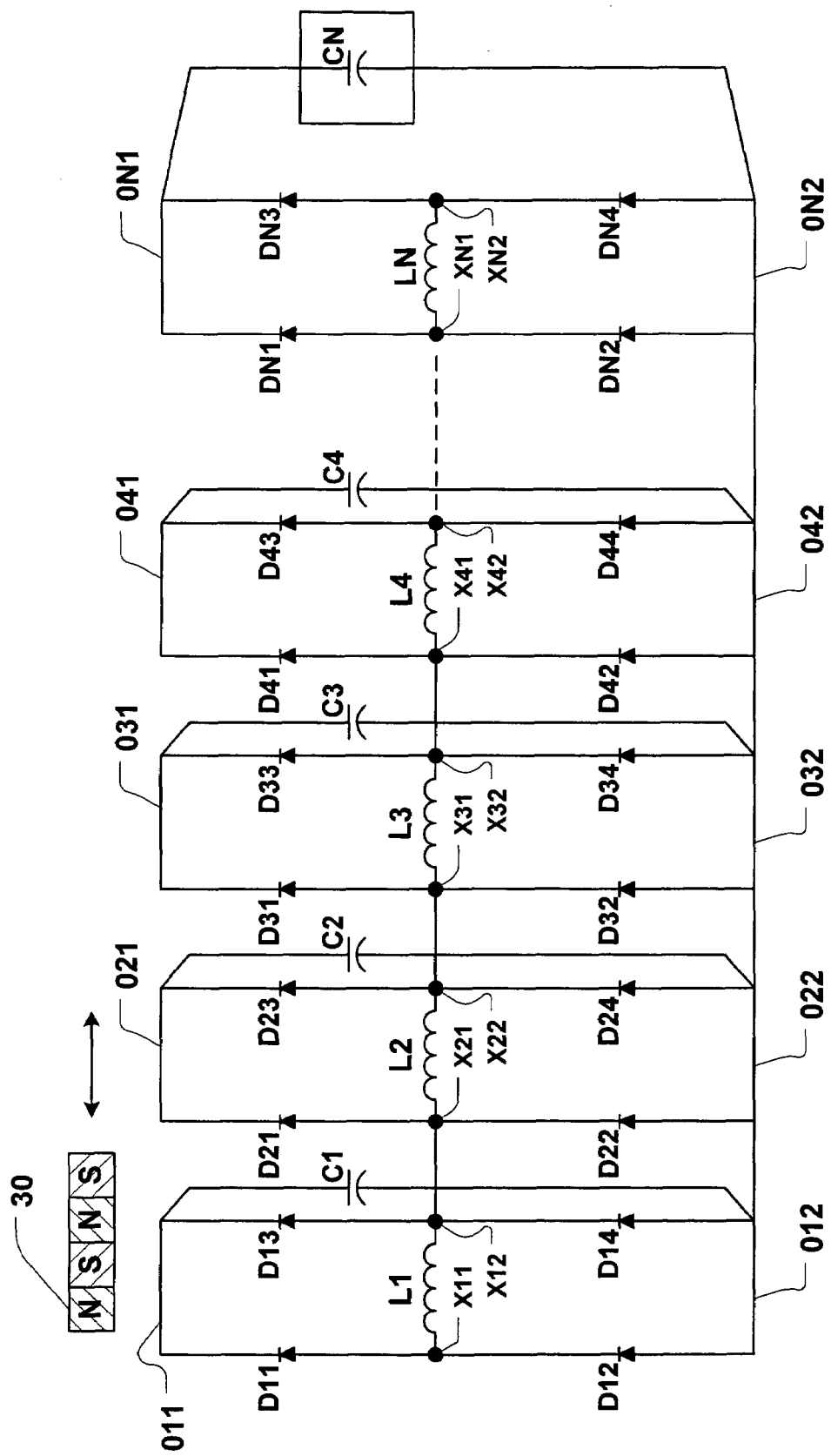
FIG. 9 is a schematic diagram of another embodiment of the invention using a tapped coil configuration.

FIG. 9 illustrates that an ICA whose coils are configured in a "tapped" coil configuration can be operated so that each coil section is electrically independent of the other and can function similarly to the configuration of the circuit of FIG. 5 (and FIG. 7). By way of example, for any "tapped" coil configuration, as shown in FIG. 9, adjacent coils [e.g., Li and L(i+1)] share a common node [e.g., Xi2 and X(i+1)1]. Each coil may have its own independent output (Oi1) and each coil terminal (Xi1, Xi2) may be connected via its own diodes (Di1, Di3) to the output Oi1. This could also be done between each coil terminal and its other output terminal Oi2. However, it is generally more efficient to have one output line (e.g., Oi2) of all the coils connected in common. The operation of the "tapped" configuration of FIG. 9 would be similar to that shown for FIGS. 6 and 7.

FIG. 10 shows typical waveforms which help explain the operation of a LEG embodying the invention. Waveform A suggests a sinusoidal motion for the PMA 30 which may well be encountered in WECs. Waveforms B, C, D, E, E, F and G illustrate the voltages produced across the individual coils when the PMA passes over or in close proximity to the coils.

Figure 1:
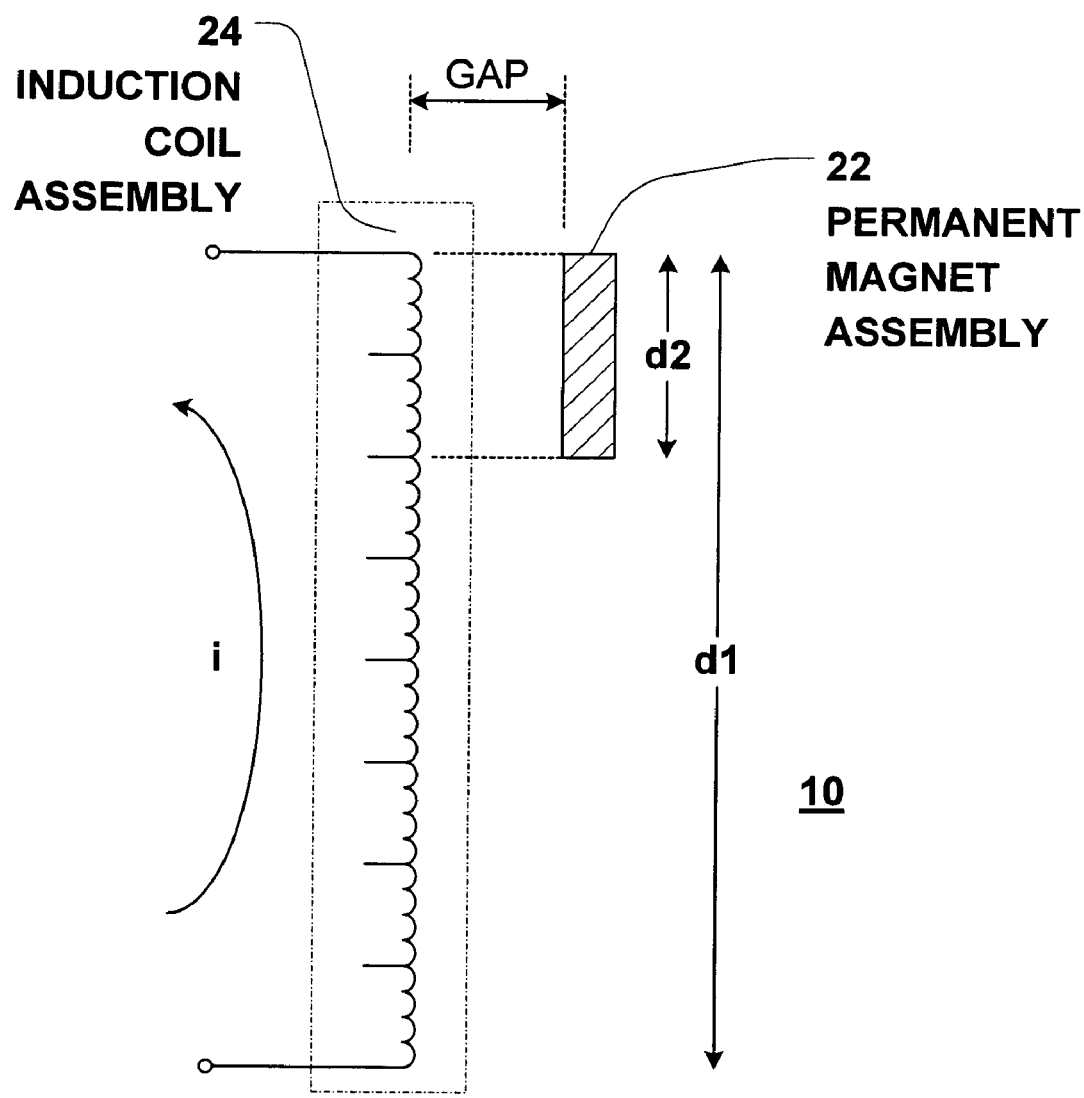
FIG. 1 is a schematic diagram illustration of a prior art Linear Electric Generator (LEG) permanent magnet and coil assembly.
Figure 2:
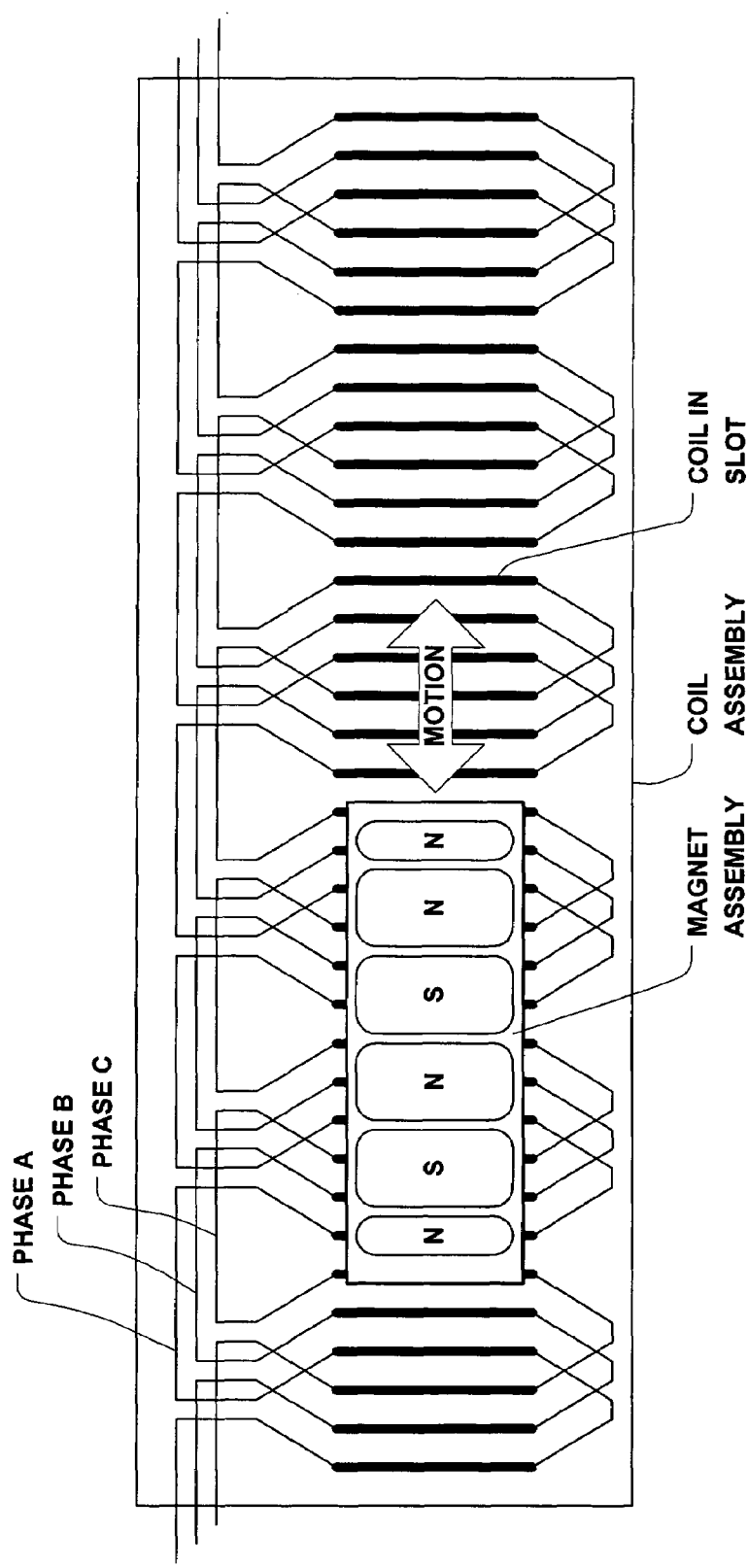
FIG. 2 is a schematic diagram illustrating a prior art permanent magnet and induction coil assembly of a LEG.

Waveform H of FIG. 10 represents the composite or total voltage seen across the power terminals (310, 312) when the unidirectional coil coupling embodying the invention is employed. That is, the "active" coils are connected across the output lines 310 and 312 via two forward biased diodes while the "inactive" coils are de-coupled from the output lines by at least one reverse biased diode. Waveform I of FIG. 10 represents the prior art composite voltage seen across the power terminals for a configuration of the type shown in FIG. 1. The voltage (e.g., waveform H) generated across the power terminals (310, 312), when only the excited coils are coupled via two diodes across the output power lines, is of larger amplitude than that shown in waveform I, when all the coils are connected in series across the power lines. Thus, the comparison of waveforms H and I indicates that the amplitude of the voltage produced in systems embodying the invention is significantly greater than that obtained in the prior art system of FIG. 1. Consequently a significant benefit is obtained with "passive" coupling of the coils in accordance with the invention.

What is claimed is:

1. A linear electric generator (LEG) comprising:
   a winding of length d1 along which is to be passed a permanent magnetic assembly (PMA) of length d2, where d2 is smaller than d1, for producing an electrical current in the winding;
   said winding being segmented into N sections of induction coils directly connected end to end and disposed linearly along said distance d1; the induction coils exhibiting inductance and resistance along their length;
   means for passing said permanent magnetic assembly (PMA) of length d2, where d2 is smaller than d1, along and over the linearly disposed induction coils while maintaining a small gap between the magnet and the coils, the passing of the PMA over a particular coil section causing that particular coil section to be excited in that it produces a voltage across the coils in that particular section; and
   unidirectional conducting means coupled to the N sections of induction coils for automatically coupling the voltages generated in the excited coils, in close proximity to the passing PMA, between first and second power output terminals via a relatively low impedance path and impeding the non-excited coils from loading down and dissipating the voltages produced at the first and second power output terminals.

2. The LEG as claimed in claim 1, wherein each one of said N section of induction coils includes an induction coil having first and second terminals; and wherein said unidirectional conducting means coupled to the coils includes means, as to each coil, for connecting a first diode between the first terminal of each coil and a first coil output point, a second diode between the first terminal of each coil and a second coil output point, a third diode connected between the second terminal of each coil and the first coil output point, and a fourth diode connected between the second terminal of each coil and the second coil output point, with adjacent sections of coils sharing diodes.

3. The LEG as claimed in claim 2, wherein the second terminal of each coil is connected to the first terminal of the next adjacent coil, and wherein adjacent coils share diodes; and wherein the first output of each coil is connected to said first power output terminal and the second output of each coil is connected to said second power output terminal.

4. The LEG as claimed in claim 1, wherein each one of said N sections of coils includes an induction coil having first and second terminals coupled via four diodes between first and second output points; and a storage element connected between said first and second output points for storing the voltages produced across the induction coil in response to the movement of the PMA relative to the coil; and wherein adjacent sections of coils share diodes.

5. The LEG as claimed in claim 4, including means for selectively coupling the storage elements of each coil section to a central storage element.

6. The LEG as claimed in claim 5, wherein said means for selectively coupling the storage elements of each coil section to a central storage element includes switching means for transferring the charge from each coil to said central storage element.

7. The LEG as claimed in claim 1, wherein the means for passing the PMA along and over the coils includes attaching and disposing the N sections of induction coils along one of a float and column and attaching the PMA to the other one of the float and column; and wherein the float and column can move relative to each other whereby the PMA moves over and along the coils.

8. In a wave energy converter (WEC) having a shaft and a float which can move relative to each other, means for generating electricity comprising:
  N sections of induction coils directly connected end to end mounted on one of said shaft and float extending linearly a distance d1; the induction coils exhibiting inductance and resistance along their length;
  a permanent magnetic assembly (PMA) mounted on the other one of said shaft and float, said PMA being of length d2, where d2 is smaller than d1, said PMA being mounted such that it can pass along and over the linearly disposed induction coils while maintaining a small gap between the magnet and the coils, the passing of the PMA over a particular coil section causing that particular coil section to be excited in that it produces a voltage across the coils in that particular section; and
  unidirectional conducting means coupled to the coils for automatically coupling the voltages generated in the excited coils in close proximity to the passing PMA between first and second power output terminals via a relatively low impedance path and impeding the non-excited coils from loading down and dissipating the voltages produced at the first and second power output terminals.

9. In the WEC as claimed in claim 8 wherein each one of said N section of induction coils includes an induction coil having first and second terminals: and wherein said unidirectional conducting means coupled to the coils includes means for connecting a first diode between the first terminal of each coil and a first output point, a second diode between the first terminal of each coil and a second output point, a third diode connected between the second terminal of each coil and the first output point, and a fourth diode connected between the second terminal of each coil and the second output point.

10. In the WEC as claimed in claim 9, wherein each coil has a first output point and a second output point and wherein a separate load is connected between the first and second output points of each load.

11. In the WEC as claimed in claim 10 wherein one of the first and second output points associated with each coil is coupled via selectively enabled switching means to said first power output terminal and the other one of the first and second points associated with each coil is coupled to said second power output terminal.

12. In the WEC as claimed in claim 8, wherein the coil is a tapped coil.

13. A combination comprising:
  N sections of coils directly connected end to end and extending a distance d1 along a support member; each section of coil having first and second terminals and exhibiting inductance and resistance between its two terminals;
  a permanent magnet assembly (PMA) having a length d2;
  means for mounting the PMA and the N sections of coils in close proximity to each other and so as to move relative to each other for causing voltages to be developed across the sections of coil in close proximity to the PMA, as the PMA moves by the coils;
  first and second power output terminals for coupling thereto voltages obtained from said coils;
  unidirectional conducting means coupled between said coils and said first and second power terminals for transferring voltages developed across the coils to said first and second power output terminals.

14. The combination as claimed in claim 13, wherein a load is connected across said first and second power terminals which include a power converter and wherein d2 is less than d1.

15. The combination as claimed in claim 13 wherein d2 is less than d1 and wherein said unidirectional conducting means includes diodes.

16. The combination as claimed in claim 15 wherein each coil is coupled via at least one diode between said first and second power terminals.

17. The combination as claimed in claim 15, wherein excited coils are connected in series between first and second output points via two diodes conducting conventional current in the same direction.

18. The combination as claimed in claim 15 wherein the first terminals of the N sections of coils are connected in common to a first power terminal, and wherein the second terminals of each one of the N sections of coils are coupled: (a) via unidirectional conducting elements, poled to conduct current in one direction, to a first node, and (b) via unidirectional conducting elements, poled to conduct current in the opposite direction to said one direction, to a second node; and means coupling a power converter between the first and second power terminals.

19. The combination as claimed in claim 13, wherein the N sections of coils are mounted on one of a shaft and shell and the permanent magnet is mounted on the other one of the shaft and shell, where the shaft and shell are part of a buoy intended to be placed in a body of water and to be subjected to waves in the body of water causing the shell and shaft to move relative to each other as a function of the waves and wherein d2 is less than d1.

20. In a system which includes N sections of induction coils directly connected end to end and disposed linearly along a supporting member for distance d1, and wherein a voltage is developed across the coils by passing a permanent magnet assembly (PMA), of length d2, along the induction coils while maintaining a small gap between the magnet and the induction coils; the improvement comprising:
  unidirectional conducting means coupled between each coil section and first and second output lines for coupling the voltages developed within the coil, when the PMA passes over the coil, to first and second output points via unidirectional means providing a relatively low impedance path and inhibiting loading of the voltages by non-excited coil sections.

21. In the system as claimed in claim 20, wherein d2 is less than d1, and wherein said unidirectional conducting means are diodes.

* * * * *